(12) United States Patent  
Lorincz

(10) Patent No.: US 6,406,241 B1
(45) Date of Patent: Jun. 18, 2002

(54) PUSH-PIN HAVING A CURVED NECK

(75) Inventor: Eugene M. Lorincz, Cinnaminson, NJ (US)

(73) Assignee: Moore Push-Pin Company, Wyndmoor, PA (US)

(*) Notice: Subject to any disclaimer, the term of this patent is extended or adjusted under 35 U.S.C. 154(b) by 0 days.

(21) Appl. No.: 09/472,361

(22) Filed: Dec. 23, 1999

(51) Int. Cl.[7] ............................................... F16B 15/00
(52) U.S. Cl. ........................ 411/477; 411/439; 411/461; 411/923
(58) Field of Search ................................. 411/477, 478, 411/439, 923, 461, 463, 464, 465, 488, 482, 451.2; D11/221; 24/429; D8/388, 391, 393, 300, 303, 307; D7/393, 482

(56) References Cited

U.S. PATENT DOCUMENTS

| 235,515 | A |   | 12/1880 | Clough |   |
|---|---|---|---|---|---|
| 317,090 | A |   | 5/1885 | Cave et al. |   |
| 363,597 | A |   | 5/1887 | Clough |   |
| 451,213 | A | * | 4/1891 | Shipley | 411/923 |
| 654,319 | A |   | 7/1900 | Moore |   |
| 752,925 | A |   | 2/1904 | Ryan |   |
| 793,123 | A |   | 6/1905 | Carroll |   |
| 975,235 | A |   | 11/1910 | Hansen |   |
| 978,185 | A |   | 12/1910 | McMillan |   |
| 1,063,057 | A |   | 5/1913 | Oertel |   |
| 1,066,095 | A |   | 7/1913 | Falk |   |
| 1,066,495 | A |   | 7/1913 | Helvig et al. |   |
| 1,076,983 | A |   | 10/1913 | Jerrim |   |
| 1,331,524 | A |   | 2/1920 | Pleister |   |
| 1,338,988 | A | * | 5/1920 | Kinoshita | 411/478 |
| 1,647,934 | A | * | 11/1927 | Sallop | 411/477 |
| 1,801,077 | A |   | 4/1931 | Gentry |   |
| 1,991,561 | A |   | 2/1935 | Krantz |   |
| 2,257,641 | A |   | 9/1941 | Muller |   |
| D149,099 | S |   | 3/1948 | Sweet |   |
| 2,439,516 | A |   | 4/1948 | Holcomb |   |
| D175,275 | S |   | 8/1955 | Romine |   |
| 2,913,204 | A | * | 11/1959 | Stewart | 411/477 |
| 2,959,897 | A | * | 11/1960 | Baker | 411/478 |
| RE27,138 | E |   | 6/1971 | O'Sullivan |   |
| 3,693,496 | A |   | 9/1972 | Koide |   |
| 5,473,134 | A | * | 12/1995 | Susgin | 411/478 |

FOREIGN PATENT DOCUMENTS

| DE | 500007 | * | 6/1930 | ................. 411/439 |
| SE | 5170 | * | 11/1893 | ................. 411/439 |

* cited by examiner

Primary Examiner—Flemming Saether
(74) Attorney, Agent, or Firm—Woodcock Washburn LLP

(57) ABSTRACT

The push-pins of the present invention are defined by at least one pin section and an integral, at least partially corrugated finger grasping section, and are formed from a single piece of rigid material. Methods for the production of such push-pins include providing a piece of substantially flat rigid material and a press, and employing the press to stamp portions of the material to create a plurality of push-pins therefrom.

15 Claims, 7 Drawing Sheets

PUSH-PIN HAVING A CURVED NECK

FIELD OF THE INVENTION

The present invention relates generally to the field of push-pins. In particular, the present invention relates to improved push-pins stamped from a single piece of rigid material as well as methods for the production of such push-pins.

BACKGROUND OF THE INVENTION

Push-pins are well known in the art. A push-pin is an article used to hold papers and the like in place on a bulletin board, wall or other surface by means of a pin portion that pierces the material to be held in place. A handle portion is provided for grasping and pushing.

Known push-pins are either manufactured by assembling the pin portion to the handle portion or by molding the pieces together. Usually, the handle is cylindrical in shape to facilitate grasping and pushing and tends to add to the bulk of the push-pin. See, for example, U.S. Pat. Nos. 654,319 and 1,991,561. Prior art style push-pins are satisfactory in design, but domestic made push-pins may find difficulty competing on price with non-domestic made push-pins due to lower non-domestic steel prices and labor costs. In addition, the bulk of the prior art style push-pins require suitable packaging that may add to the cost to the customer.

It is desirable to provide a push-pin and method of manufacturing the same that is simple and lower in both material and labor costs than prior art style push-pins, and that also has less bulk than prior art push-pins. The present invention achieves these goals.

SUMMARY OF THE INVENTION

A push-pin is defined by at least one pin section and an integral, at least partially corrugated finger grasping section formed from a single piece of rigid material. The finger grasping section includes integrally formed head, neck and shoulder sections, and the neck section connects the head and shoulder sections. The push-pins also include at least one pin section that extends longitudinally from the shoulder section. The pin, head and shoulder sections of the push-pin are substantially co-planar, while the pin, head and shoulder sections are substantially flat relative to the neck section. An outwardly protruding rib may be formed on both the shoulder and pin sections of the push-pins to add strength.

A method of manufacturing a push-pin comprises providing a piece of substantially flat rigid material and a press. The press is employed to stamp portions of the material to create a plurality of articles therefrom. The material is advanced through the press so that, in sequential order, a plurality of stamps form the push-pins of the present invention.

DETAILED DESCRIPTION OF THE PREFERRED EMBODIMENT

Figure 15:
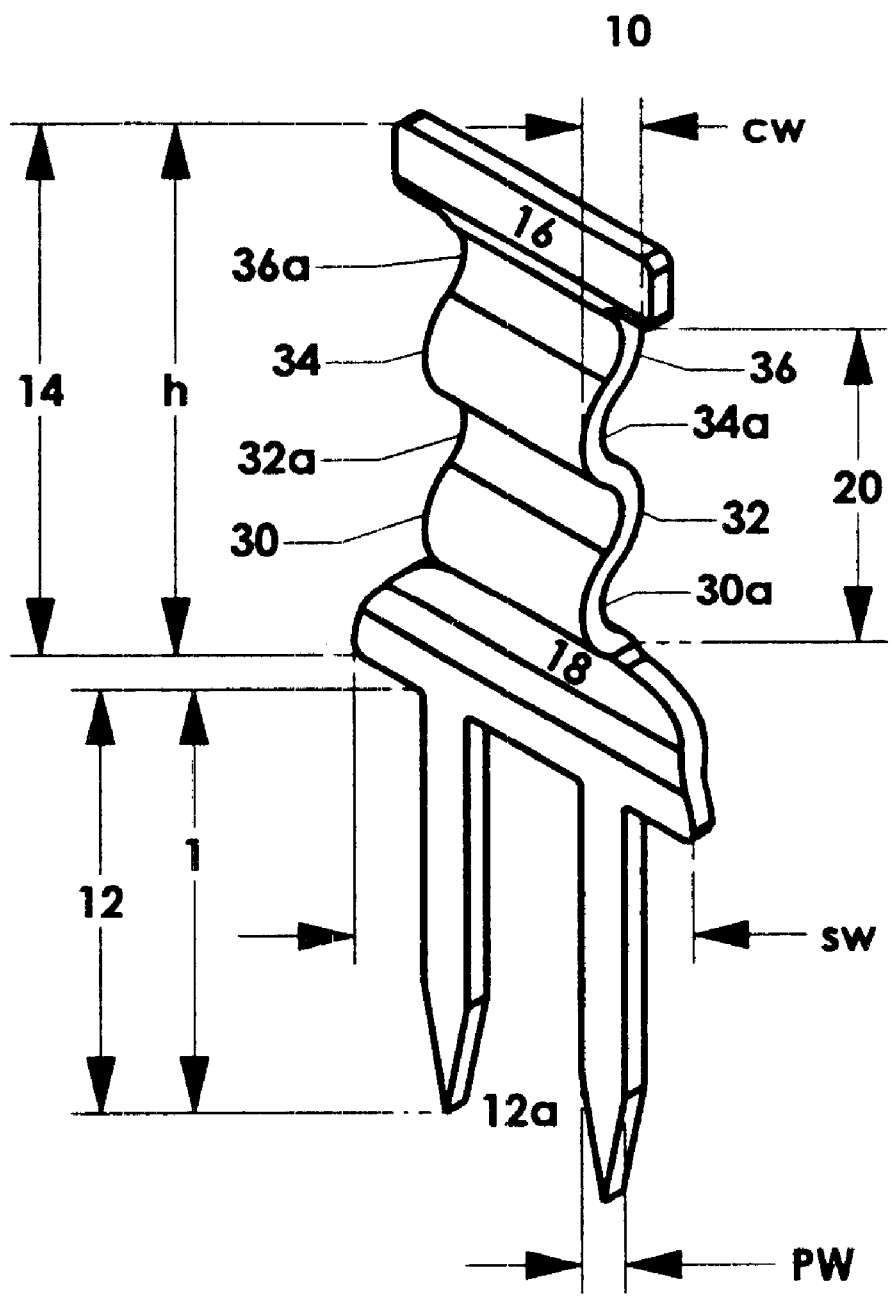
FIG. 15 is a perspective view of another embodiment of a push-pin according to the present invention.
Figure 16:
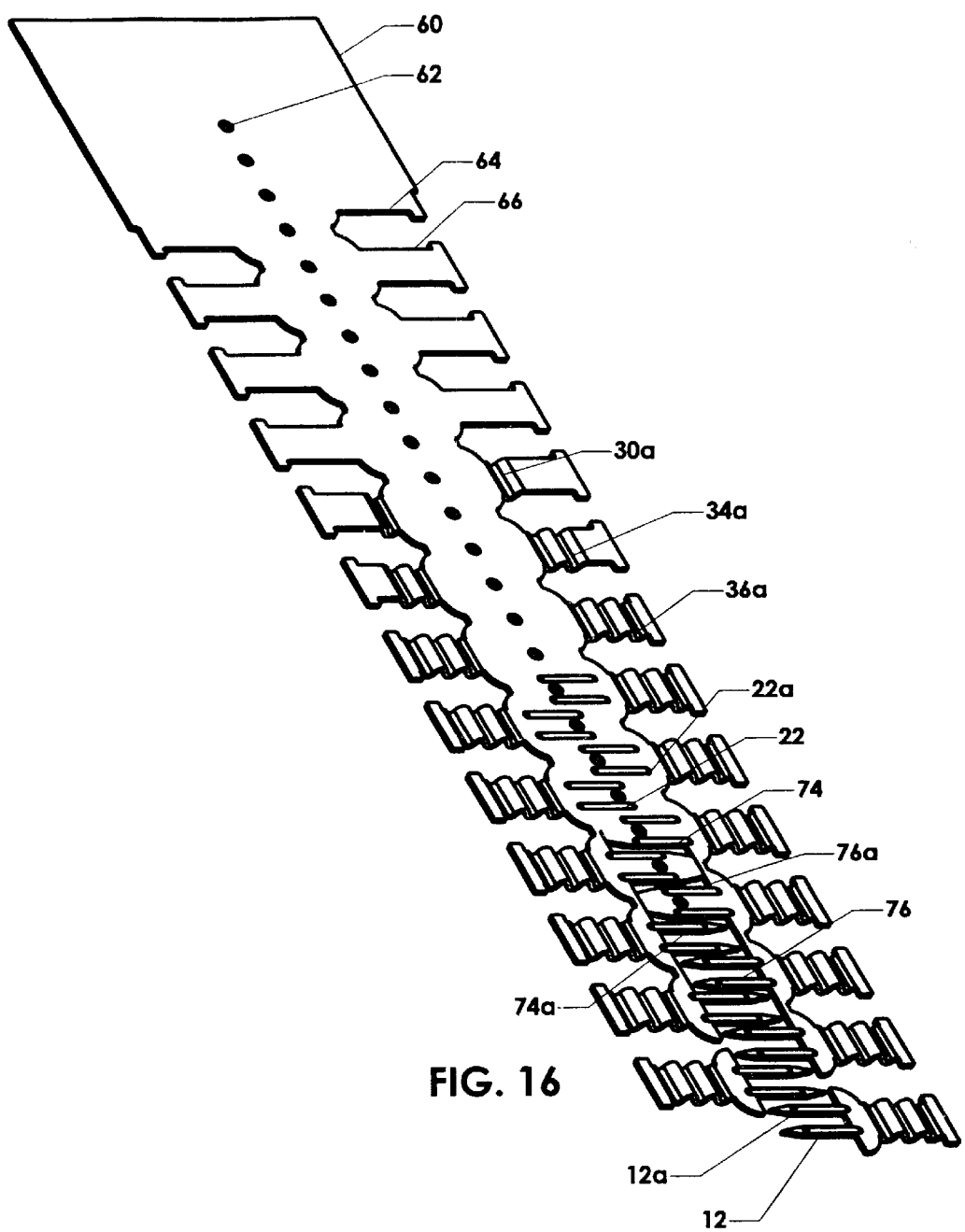
FIG. 16 is a perspective view illustrating various stages of manufacture of the push-pins of the present invention, according to another method of the present invention.

Referring to the drawings, in particular FIGS. 2, 4, 5, 8, 10 and 11, a push-pin 10 according to the present invention includes at least one pin section 12 and a finger grasping section 14 that is at least partially corrugated with corrugations 30–38a to make the push-pin easier to grasp with the fingers. It is preferred that the partially corrugated finger grasping section 14 is integral with the pin section 12. The push-pins 10 of the present invention are not limited to a single pin section 12. Referring to FIG. 15, for example, a push-pin 10 according to the present invention may include a first pin section 12, a second pin section 12a and a finger grasping section 14 that is at least partially corrugated. It is preferred that the partially corrugated finger grasping section 14 is integral with the pin sections 12–12a.

Figure 1:
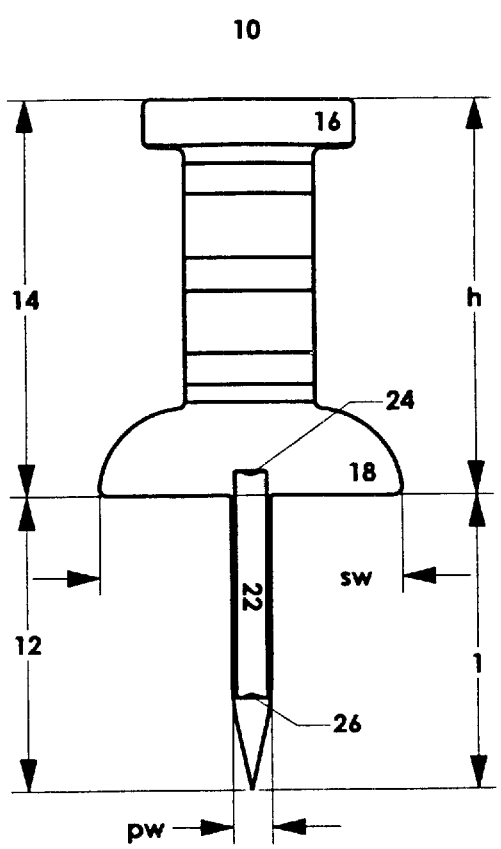
FIG. 1 is a front plan view of one embodiment of a push-pin according to the present invention.
Figure 7:
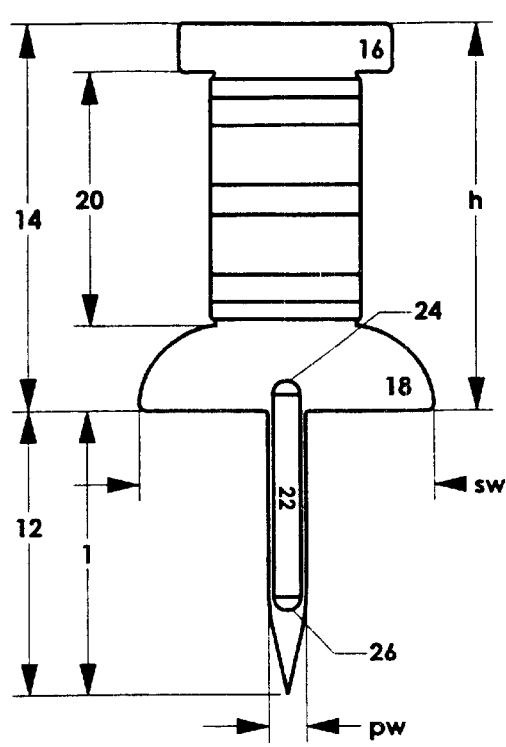
FIG. 7 is a front plan view of another embodiment of a push-pin according to the present invention.

In one embodiment of the present invention the finger grasping section 14 includes a head section 16, a shoulder section 18 and a corrugated neck section 20. It is preferred that the neck section 20 extends between the head section 16 and shoulder section 18. Preferably the head 16 and shoulder 18 sections are connected by the neck section 20. With reference to FIGS. 1, 4, 7, 10 and 15, the height (h) of the finger grasping section 14 may, in one preferred embodiment, be about ½ of an inch. Referring to FIGS. 1, 7 and 15, in one preferred embodiment, the width (sw) of the shoulder section 18, at its widest point, may be about ⅜ of an inch. The width (sw) of the shoulder section 18 at its widest point may be the maximum width of the stamped push-pin 10. It is well within the skill of those in the art to vary the dimensions of the push-pin 10 with different embodiments of the present invention.

Figure 2:
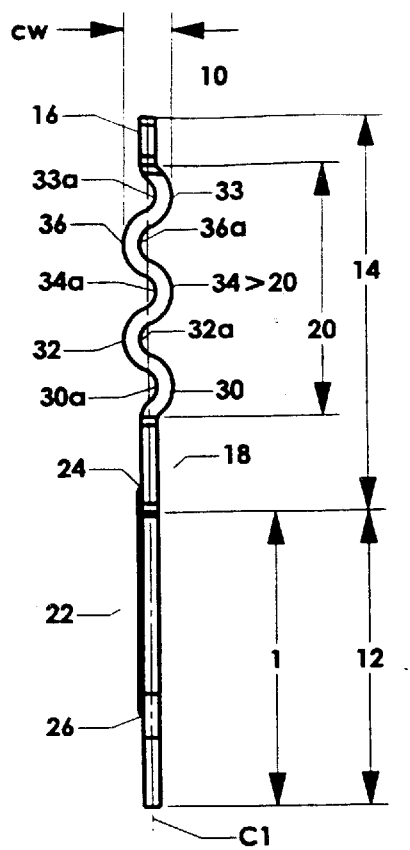
FIG. 2 is a side plan view of the push-pin of FIG. 1.
Figure 3:
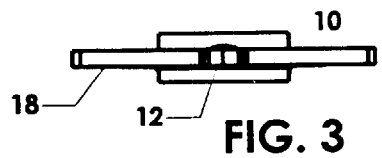
FIG. 3 is a bottom plan view of the push-pin of FIG. 1.
Figure 4:
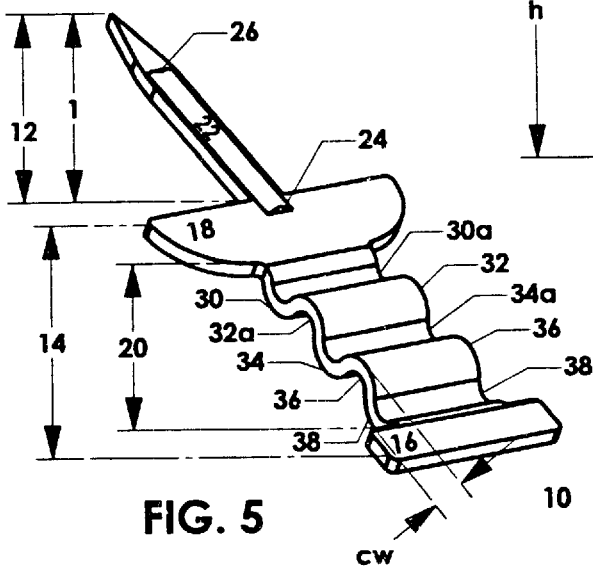
FIG. 4 is a perspective view of the push-pin of FIG. 1.
Figure 5:
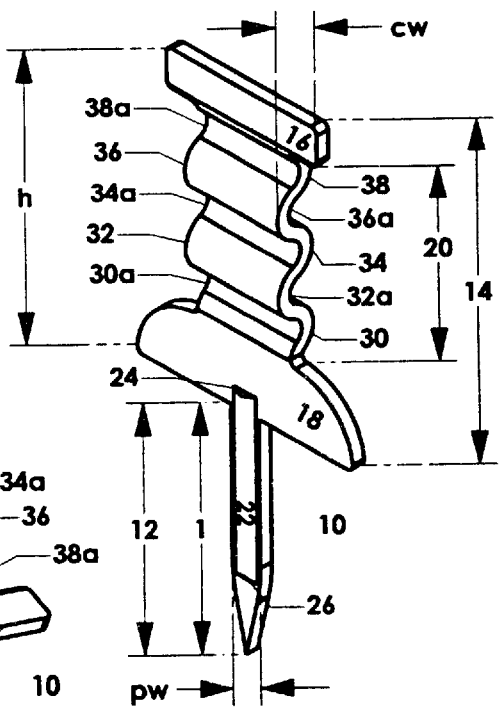
FIG. 5 is a different perspective view of the push-pin of FIG. 1.
Figure 8:
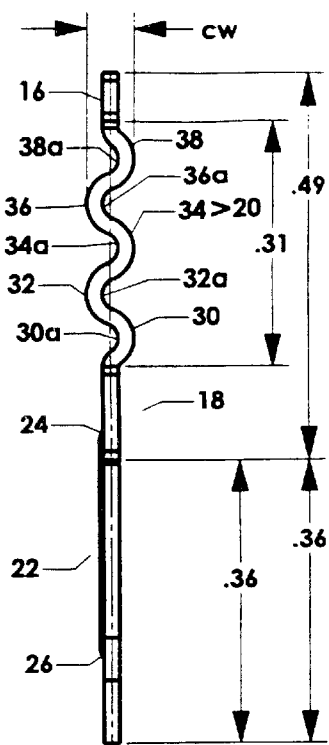
FIG. 8 is a side plan view of the push-pin of FIG. 7.
Figure 9:
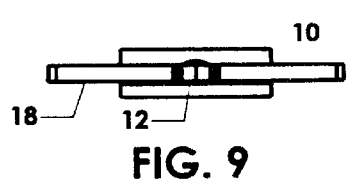
FIG. 9 is a bottom plan view of the push-pin of FIG. 7.
Figure 10:
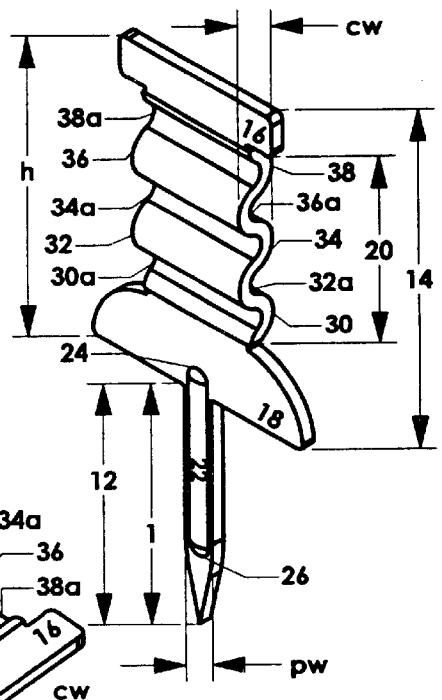
FIG. 10 is a perspective view of the push-pin of FIG. 7.
Figure 11:
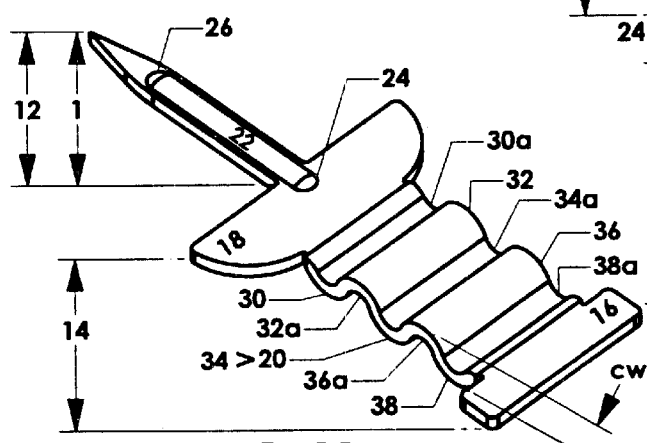
FIG. 11 is a different perspective view of the push-pin of FIG. 7.

In another embodiment of the present invention the neck section 20 is at least partially corrugated as shown. It is preferred that the neck section 20 has at least one corrugation 30–38a. For purposes of the present invention, a corrugation may be defined as a ridge or groove of a material that has been corrugated. Therefore, referring to the drawings, in particular FIGS. 2, 4, 5, 8, 10, 11 and 15, the neck section 20 may have a first corrugation 30, a second corrugation 32, a third corrugation 34, a fourth corrugation 36 and/or a fifth corrugation 38. The neck section 20 may also have a first corrugation 30a, a second corrugation 32a, a third corrugation 34a, a fourth corrugation 36a and/or a fifth corrugation 38a. With reference to FIGS. 2 and 8, a corrugation may have an outer width (cw) of about 1/16 of an inch. For purposes of the present invention, the outer width (cw) of a corrugation may be defined as the distance between a first ridge on a side and a second ridge on the opposite side of a push-pin. With reference to FIGS. 2 and 8, for example, a corrugation may have an outer width (cw) of about 1/16 of an inch when measured between a first ridge 30 and a second ridge 32, a first ridge 34 and a second ridge 36, or a first ridge 36 and a second ridge 38. It is well within the skill of those in the art to vary corrugation width (cw) in different embodiments of the present invention.

In one embodiment of the present invention the pin section 12–12a, head section 16 and shoulder section 18 are substantially co-planar. Referring to FIGS. 2 and 8, a plane C1 bisects the push-pin 10 such that the pin 10 is substantially symmetrical about, and substantially co-planar with, plane C1. The geometric centers of the pin 12, head 16 and shoulder 18 sections are disposed in substantially identical positions with respect to the plane C1. Hence, the pin 12, head 16 and shoulder 18 sections are substantially co-planar.

In another embodiment the pin section 12–12a, head section 16 and shoulder section 18 are relatively flat relative to the neck section 20. In another embodiment the pin section 12–12a extends longitudinally from the shoulder section 18 of the finger grasping section 14. It is preferred that the pin section 12–12a is a pointed projection extending from the shoulder section 18. With reference to FIGS. 1, 2, 4, 5, 7, 8, 10, 11 and 15, the length (l) of the pin section 12–12a may be about 3/8 of an inch. The width (pw) of the pin section 12–12a may be about 3/64 of an inch, with reference to FIGS. 1, 4, 7, 10 and 15. A portion of the pin section 12–12a may be tapered. In one preferred embodiment, the pin section 12–12a tapers from 3/64 of an inch in width (pw) to a more narrow point. It is well within the skill of those in the art to vary the dimensions of the pin section in different embodiments of the stamped push-pins of the present invention.

In one embodiment of the present invention an integral outwardly protruding rib 22 is formed on both the shoulder sections 18 and a pin section 12–12a. The rib 22 reinforces the pin section 12–12a by stiffening it. It may also serve to reinforce the finger grasping section 14. Referring to FIGS. 2–3 and 8–9, it is preferred that the outwardly protruding rib 22 is defined by a first face which is convex in shape. It is preferred that the outwardly protruding rib 22 is further defined by a second opposing face, not visible in the Figures, which is concave in shape.

With reference to FIGS. 1–2, 4–5, 7–8 and 10–11, it is preferred that one end 24 of the outwardly protruding rib 22 terminates on the shoulder section 18 of a push-pin 10 of the present invention. Preferably the outwardly protruding rib 22 has a second end 26 that terminates on the pin section 12. In one embodiment of the present invention, as shown in FIGS. 1–2 and 4–5, it is preferred that both ends 24–26 of the outwardly protruding rib 22 are open. In another embodiment, it is preferred that the both ends 24–26 of the outwardly protruding rib 22 are spherical in shape and closed, as shown in FIGS. 7–8 and 10–11.

Figure 6:
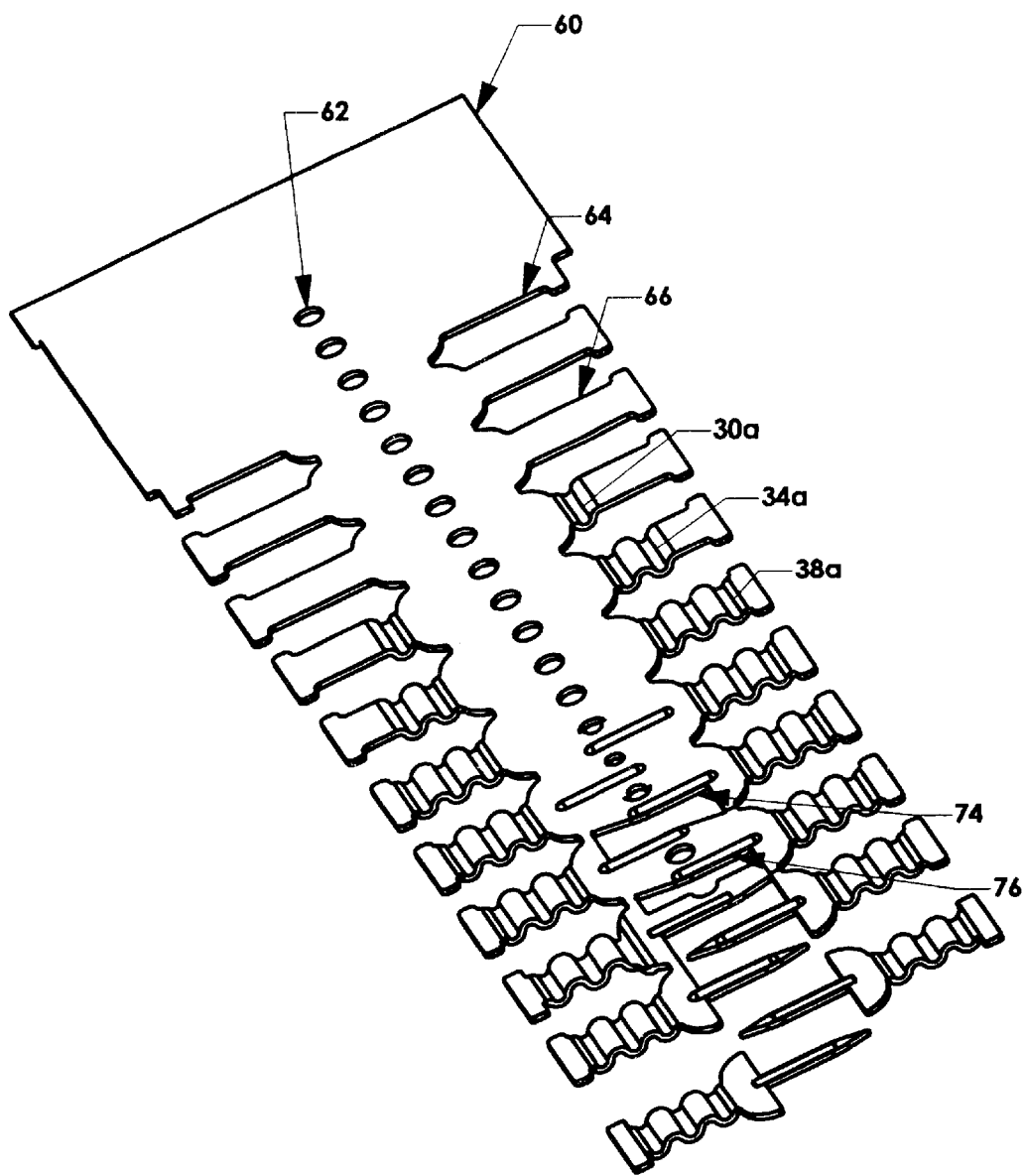
FIG. 6 is a perspective view illustrating various stages of manufacture of the push-pins of the present invention, according to a method of the present invention.

Referring to FIG. 6, there is shown a single piece of rigid material 60 having portions in various stages of manufacture. It is preferred that the material 60 is substantially flat and planar. Although those skilled in the art will recognize the various materials 60 that may be used in the present invention, it is preferred that the material 60 is steel, aluminum, brass, bronze, alloy, plastic or some space age metal. Preferably the material 60 is sheet metal. It is preferred that the material 60 is a metal strip. More preferred is that the material 60 is steel strip stock. The material 60 used in the present invention may have a thickness of about 1/64 of an inch. It is well within the skill of those in the art to vary the thickness of the material in different embodiments of the present invention.

Figure 12:
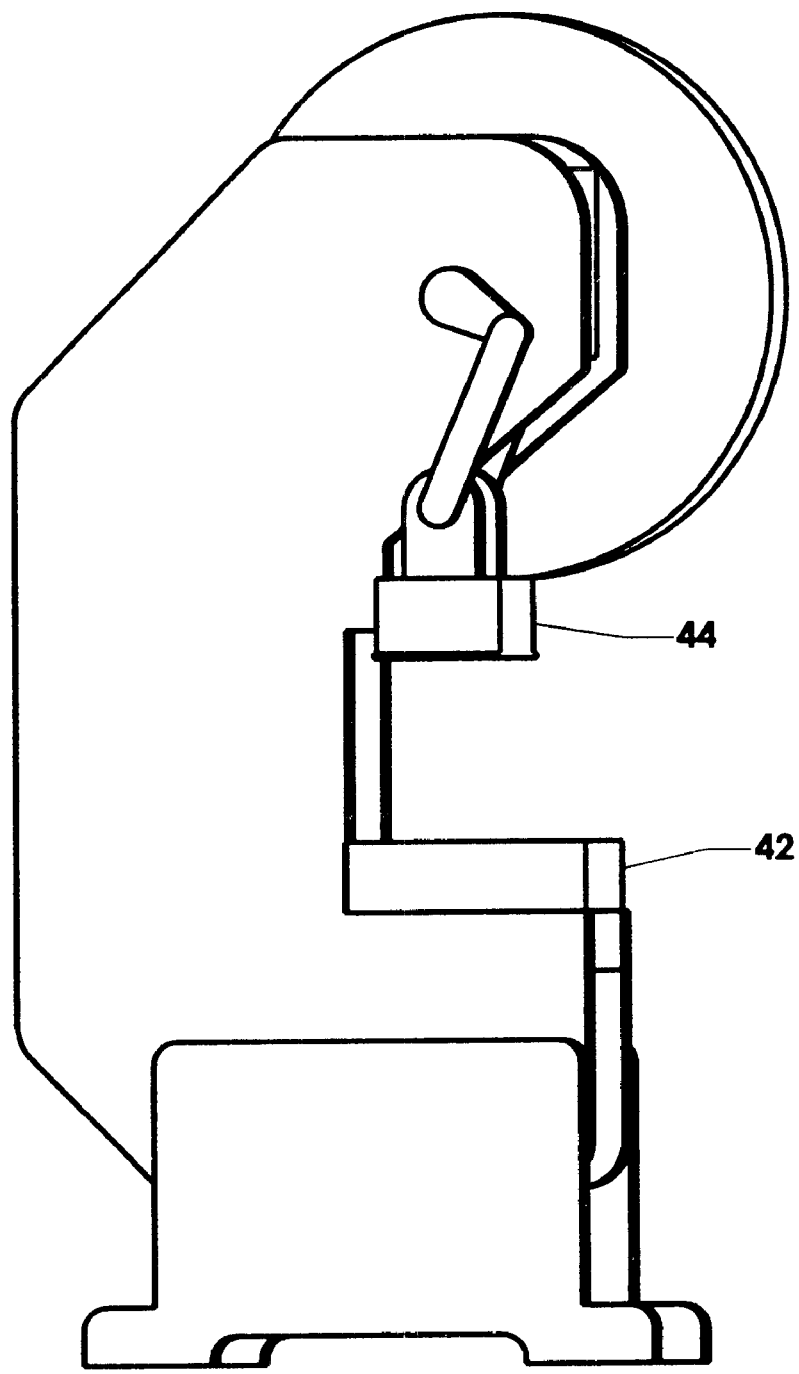
FIG. 12 is a perspective view of an exemplary press that may be used in the practice of the method of the present invention.
Figure 13:
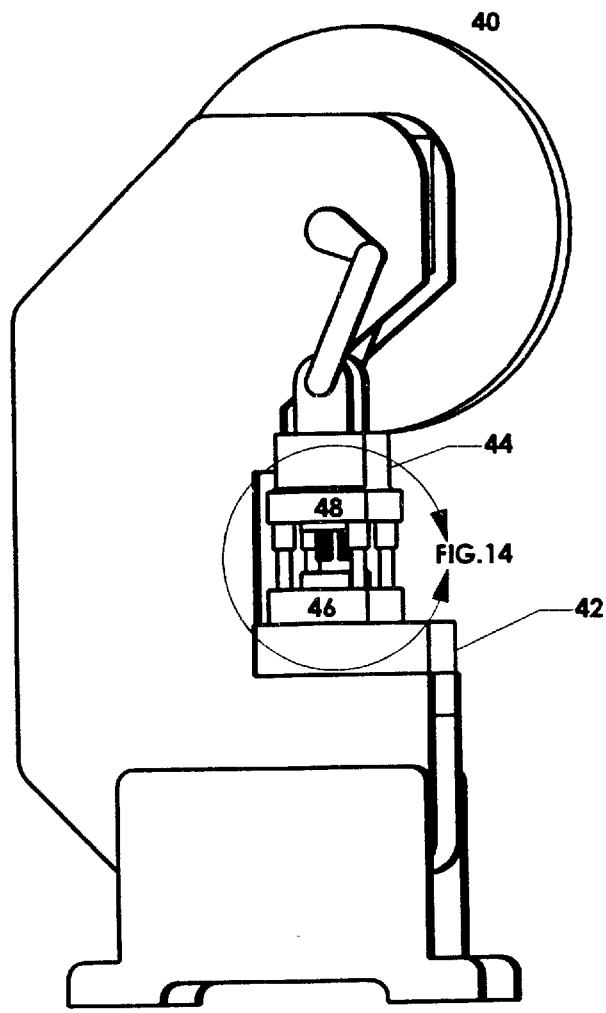
FIG. 13 is a perspective view of the press of FIG. 12 and illustrates die and stamps used to practice the method of the present invention.
Figure 14:
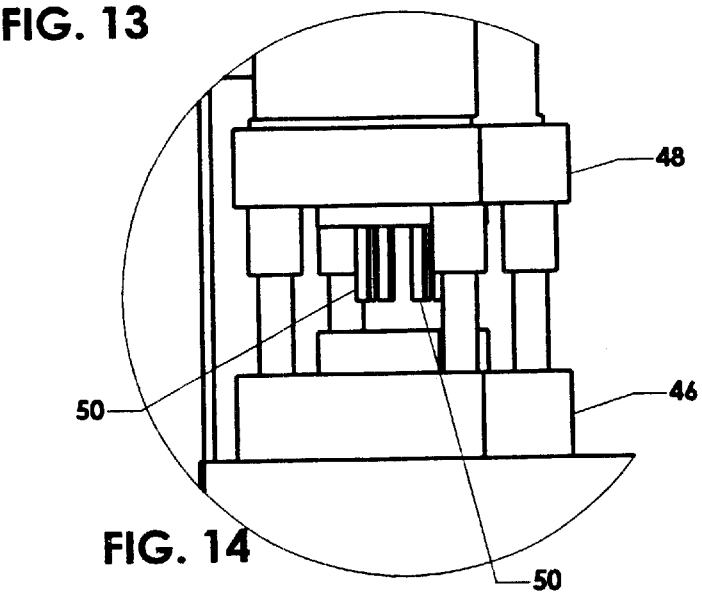
FIG. 14 is a close-up view of the encircled portion of FIG. 13.

FIGS. 12–14 illustrate a press 40 that may be used to stamp and form the push-pins 10 of the present invention. The press 40 may be a standard high speed punch press having a stationary bed or anvil 42, and a slide or ram 44 having a controlled reciprocating motion toward and away as well as at right angles to the stationary bed or anvil 42. The slide or ram 44 may be guided into the frame of the machine so as to provide a definite path of motion. The lower half of a progressive die 46 may be bolted to the stationary bed or anvil 42. The upper half of a progressive die 48 may be bolted to the slide or ram 44. The movement of the slide or ram 44 may supply the motion and force through which tools mounted in the progressive die take a single piece of material and produce finished parts in the manner as represented by FIG. 6.

A method of manufacturing the push-pin 10 will now be described. FIGS. 6 and 13–14 illustrate a press 40 having a plurality of stamps 50 which may be used to stamp and form the material 60 to form at least the pin 12 and finger grasping 14 sections of the push-pin 10. It is preferred that at least one stamp 50 form at least one leading edge 64 of the finger grasping section 14, and another stamp 50 form at least one trailing edge 66 of the finger grasping section 14. Preferably at least one stamp 50 form at least one leading edge 74 of the pin section 12, and another stamp 50 form at least one trailing edge 76 of the pin section 12. Preferably at least one stamp 50 form a first corrugation 30a, another stamp 50 form a second corrugation 34a, and yet another stamp 50 form a third corrugation 38a of the finger grasping section 14.

In a preferred embodiment, the press 40 having a plurality of stamps 50 may be used to form an outwardly protruding rib 22. For example, it is preferred that the outwardly protruding rib 22 is formed by the technique of coining. The technique of coining involves using a press 40 and die to stretch material 60 over a raised surface so as to form a first face convex in shape and a second face concave in shape. Coining may increase the temper of the material coined, for example the material defining the outwardly protruding rib 22. Temper may increase as a result of the carbon content of the material coined. Those skilled in the art are familiar with the technique of coining as well as a variety of other techniques that may be used to form the outwardly protruding rib 22.

The plurality of stamps 50 may include at least one punch. The punch may be used to stamp and form the push-pins 10. The material 60 is advanced through the press so that the pin 12 and finger grasping 14 sections are formed by the punch. The punch is capable of forming a guide within the material 60 for securing, orienting and advancing the material within the press. Preferably, the punch is capable of forming an outwardly protruding rib 22 on the pin 12 and finger grasping 14 sections.

In one preferred embodiment, the press 40 may be used to stamp a single piece of substantially flat rigid material 60 so as to form a plurality of the push-pins 10. With reference to FIGS. 6 and 12–14, the material 60 may be advanced through the press 40 so that the pin 12 and finger grasping 14 sections are formed in sequence by a plurality of stamps 50. Preferably the plurality of stamps 50 operate simultaneously to sequentially form the pin 12 and finger grasping 14 sections of the push-pins 10 of the present invention. In another embodiment of the present invention the single piece of rigid material 60 is advanced through the press 40 so that a first plurality of stamps form at least one substantially flat pin section 12 and a second plurality of stamps form at least one corrugated finger grasping section 14. It is preferred that the pin sections 12 and finger grasping sections 14 are formed sequentially. Preferably the first and second plurality of stamps operate simultaneously to sequentially form the pin 12 and finger grasping 14 sections of the present invention.

Again with reference to FIGS. 6 and 12–14, a preferred method of sequentially forming the pin 12 and finger grasping 14 sections of push-pins 10 from a single piece of material 60 will be described. A press 40 having a plurality of stamps 50 is employed to form a guide 62 within the material 60 for securing, orienting and advancing the material 60 within the press 40. As the material 60 is advanced through the press 40, a stamp 50 forms the leading edge 64 of the finger grasping section 14 of the push-pin 10, and then another stamp 50 forms the trailing edge 66 of the finger grasping section 14. Then a stamp 50 forms a first corrugation 30a, another stamp 50 forms a second corrugation 34a, and finally another stamp 50 forms a third corrugation 38a. A stamp 50 then forms the leading edge 74 of the pin section 12 of the push-pin 10, and another stamp 50 forms the trailing edge 76 of the pin section 12. In a preferred embodiment, a stamp 50 may then form the outwardly protruding rib 22. Finally, the formed push-pin 10 is separated from the single piece of material 60.

With reference to FIGS. 12–14 and 16, another preferred method of sequentially forming pin 12–12a and finger grasping 14 sections of push-pins 10 from a single piece of material 60 is described. A press 40 having a plurality of stamps 50 is employed to form a guide 62 within the material 60 for securing, orienting and advancing the material 60 within the press 40. As the material 60 is advanced through the press 40, a stamp 50 forms the leading edge 64 of the finger grasping section 14 of the push-pin 10, and then another stamp 50 forms the trailing edge 66 of the finger grasping section 14. Then a stamp 50 forms a first corrugation 30a, another stamp 50 forms a second corrugation 34a, and finally another stamp 50 forms a third corrugation 38a. A stamp then forms at least one outwardly protruding rib 22–22a of at least one pin section 12–12a of the push pin 10. A stamp 50 then forms a leading edge 74 of a pin section 12. A stamp 50 then forms the trailing edge 76a of another pin section 12a. A stamp 50 then forms the trailing edge 76 of a pin section 12. This stamp 50 may also form the leading edge 74a of another pin section 12a. Finally, the formed push pin 10 can be separated from the single piece of material 60.

Many changes may be made to the above description without departing from the scope of the invention. It is intended that all matter contained herein, or shown in the accompanying drawings, is to be interpreted as illustrative and not in a limiting sense, and that the language used in the following claims is intended to cover all of the features of the invention as defined by the claims.

What is claimed is:

1. A push-pin comprising:
   a flat head section;
   a flat shoulder section that is substantially co-planer with the head section;
   a flat pin section that is coupled to the shoulder section and is substantially co-planer with the head and shoulder sections; and
   a neck that extends from the shoulder section to the head section, the neck being curved and comprising a first section that is disposed entirely on a first side of a plane that extends through the head, shoulder and pin and a second section that is disposed entirely on a second side of the plane, the neck having no portion that is disposed on the second side when the first neck section is disposed on the first plane side and no portion that is disposed on the first plane side when the second neck portion is disposed on the second plane side.

2. The push-pin of claim 1, wherein the push-pin comprises sheet metal.

3. The push-pin of claim 1, further comprising an outwardly protruding reinforcing rib formed on at least a portion of both the shoulder and the pin section.

4. A push-pin comprising a substantially co-planer head and shoulder and a pin section which is coupled to the shoulder, a neck being curved such that the neck itself extends repetitively from the shoulder to the head in a first direction, from to the plane in which the pin section, head and shoulder are disposed and a second direction that opposes the first direction.

5. The push-pin of claim 4, wherein the push-pin comprises sheet metal.

6. The push-pin of claim 4, further comprising a head disposed at a first end of the neck and a shoulder disposed at a second end of the neck.

7. The push-pin of claim 6, wherein the shoulder is wider than the head.

8. The push-pin of claim 6, wherein the pin section, the head and the shoulder are substantially co-planar.

9. The push-pin of claim 6, wherein the pin section, the head and the shoulder are substantially flat relative to the curved neck.

10. The push-pin of claim 6, further comprising an outwardly protruding reinforcing rib formed on at least a portion of both the shoulder and the pin section.

11. A push-pin comprising:
   a flat head;
   a flat shoulder that is wider than the head and that is substantially co-planer with the head;
   a pin extending from the shoulder;
   a curved neck, which is coupled to the shoulder and the head, the neck comprising a first portion extends in a first direction from the plane in which the head and shoulder are disposed and a second portion that extends in a second direction, which opposes the first direction, from the plane in which the head and shoulder are disposed.

12. The push-pin of claim 11, wherein the push-pin comprises sheet metal.

13. The push-pin of claim 11, where the pin section, the head and the shoulder are substantially co-planar.

14. The push-pin of claim 11, wherein the pin section, the head and the shoulder are substantially flat relative to the neck.

15. The push-pin of claim 11, further comprising an outwardly protruding reinforcing rib formed on at least a portion of both the shoulder and the pin section.

* * * * *